Oct. 7, 1969 Q. W. SIMKINS ET AL 3,471,839

STORAGE SENSING SYSTEM FOR A MAGNETIC MATRIX EMPLOYING TWO STORAGE ELEMENTS PER BIT

Filed Sept. 14, 1965 5 Sheets-Sheet 1

INVENTORS
QUINTON W. SIMKINS
NORBERT G VOGL, JR.

BY Sughrue, Rothwell, Mion, Zinn & Macpeak
ATTORNEYS

United States Patent Office 3,471,839
Patented Oct. 7, 1969

3,471,839
STORAGE SENSING SYSTEM FOR A MAGNETIC MATRIX EMPLOYING TWO STORAGE ELEMENTS PER BIT

Quinton W. Simkins, Burlington, Vt., and Norbert G. Vogl, Jr., Poughkeepsie, N.Y., assignors to International Business Machines Corporation, Armonk, N.Y., a corporation of New York Filed Sept. 14, 1965, Ser. No. 487,169
Int. Cl. G11b 5/00
U.S. Cl. 340—174 3 Claims

ABSTRACT OF THE DISCLOSURE

A magnetic storage matrix employing two magnetic storage elements per bit and a unique arrangement of bit since and word lines. The lines are oriented with respect to the magnetic elements and to one another such that the two sense lines associated with each bit position have induced therein noise signals of equal magnitude and of both polarities. The sense lines are connected to the inputs of a differential sense amplifier. The unique arrangement of the lines causes noise signals of equal amplitude and the same polarity to propagate to the differential sense amplifier and arrive thereat in time coincidence so that noise signals do not appear on the output of the amplifier.

Figure 1:
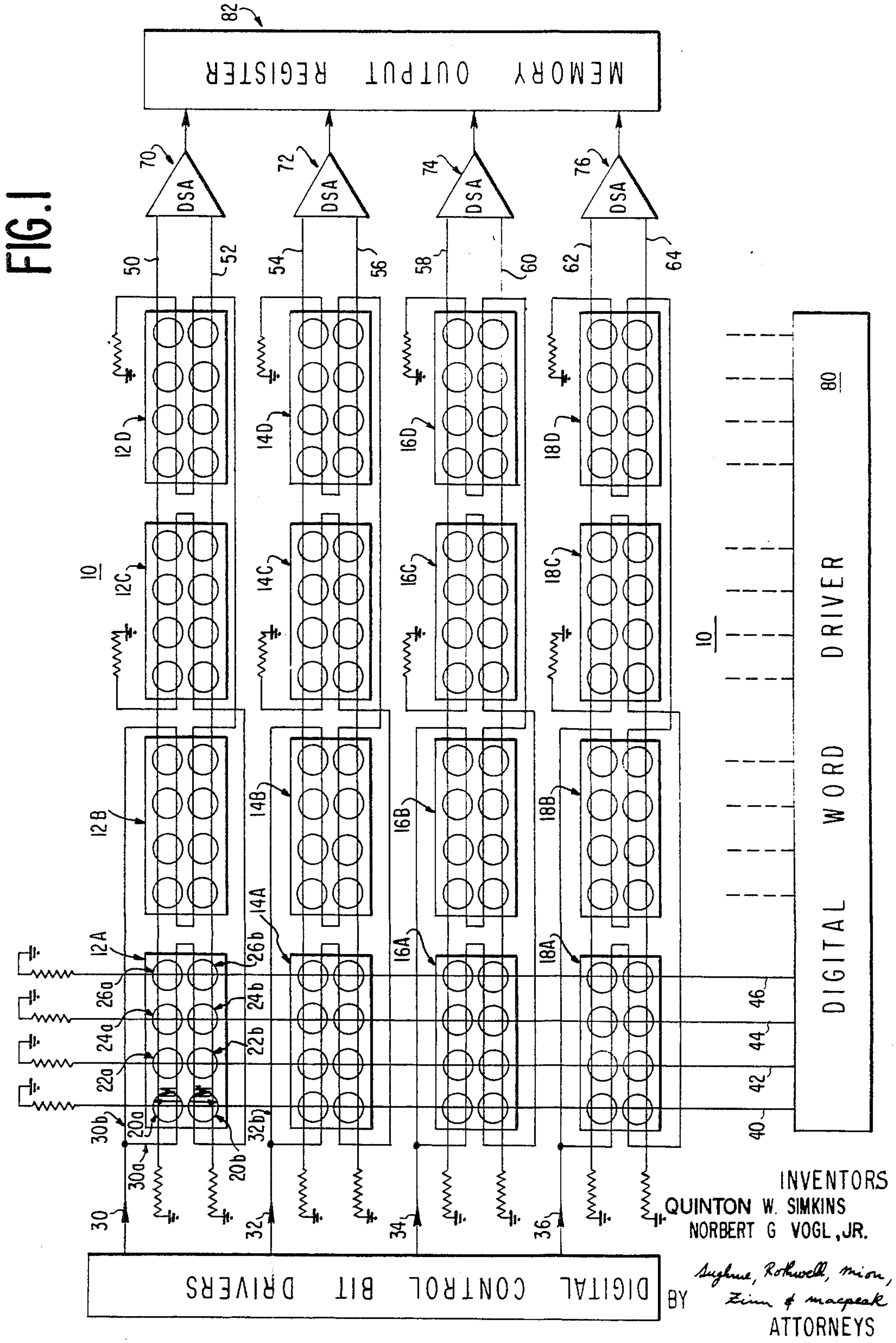

This invention relates to a sensing system for a magnetic storage device, and more particularly relates to a technique for cancelling both inductively coupled noise and capacitively coupled noise.

The sensing system includes pairs of sense conductors configured in such relationship to each other and to the other conductors of the storage device that each sense conductor receives inductively coupled noise and capacitively coupled noise equally, balanced both in time and in amplitude. The pairs of sense conductors are connected to a differential sense amplifier for common mode rejection of the balanced noise.

Use of magnetic elements capable of being magnetized in either one of two possible states for storage of complementary digital values, such as commonly indicated by the numerals "0" and "1," is well known in the digital computer art. Such magnetic elements are readily switched by magnetic fields between the stable states to either store or readout desired information.

Magnetic film memories offer highly advantageous characteristics ideally suited to the requirements of magnetic storage systems. In addition to providing very fast switching while maintaining excellent thermal properties, thin film may be formed by bulk fabrication processes, thus enabling low production costs. The usual fabrication process comprises the deposition of a nickel-iron alloy (usually the non-magnetostrictive type of 81% Ne–19% Fe composition) in a thin film of a thickness of 500 to 2000 angstroms on a planar substrate of either conductive or insulating material. The deposition may be achieved by plating, by vacuum evaporation or by sputtering, a magnetic field being imposed during the deposition to achieve uniaxial anisotropy, i.e., a preferred or easy axis of remnant magnetization of the film.

Due to the extreme thinness of the layers, the films have very low flux characteristics, requiring only a relatively low amplitude drive or switching field and consequently being subject to only minimal heating effects, even at very high switching frequencies. The switching time of the films, when employed in a practical system, is approximately 5 nanoseconds for fields of approximately 10 oersteds. In addition, the relatively simple configuration of a planar substrate-supported film provides relatively high bit density storage and permits the use of low-impedance strip transmission lines for high-frequency pulse distribution. Thus, thin film memories provide operating characteristics compatible with high speed and large capacity requirements of an efficient storage or memory system.

Thin magnetic film memories usually are constructed as word-organized or two-dimensional memories, having coincident-current write but non-coincident-current read. A first set of generally parallel lines, commonly called "word lines," lies in a common plane parallel to the substrate-supported film. A second set of generally parallel pairs of first and second parallel lines, commonly called "bit" and "sense" lines, respectively, lie in a common plane parallel to the substrate-supported film and in a direction transverse to the first set of lines.

Within the grid arrangement, the lines of the first and second bits may intersect in an orthogonal relationship or in a parallel relationship, the intersections defining magnetic interaction regions which, in the case of a continuous film, comprise a bit storage region therein, or, in the case of an array of discrete spots, are aligned therewith to be operative upon respectively associated spots.

In a word-organized thin film memory, two primary sources of spurious noise signals exist. The first source results from the unavoidable capacitive coupling which exists between word and sense lines and which causes a word signal or pulse on the word line to be coupled into each of the sense lines in the entire array which a given word line crosses. Ideally, of course, a signal is induced in the sense line only in response to the switching of the magnetic polarization within the film. The switching, however, is effectuated in response to a word or read signal on the word line. Thus, a signal on the word line not only causes the desired switching of the magnetic dipole in the film, but also causes a spurious noise signal to be capacitively coupled into the sense line.

The second source results from the unavoidable inductive coupling which exists between the parallel bit and sense lines. The parallel bit and sense line pairs commonly are thirty inches or more in length, adjacent pairs being in very close proximity. Thus, upon the conduction of bit pulses through the bit lines, from both the bit line associated therewith and adjacent bit lines, there are inductively coupled into each sense line spurious noise signals of significant amplitude.

It is well recognized that for proper operation of thin magnetic films, the magnetic switching fields, and the pulses creating them, must have a rapid rise time. A pulse having a rapid rise time, however, is subject to very efficient coupling between a line in which it is propagating and adjacent conductors, thereby creating spurious noise signals to the latter. The spurious noise signals not only detrimentally affect the signal-to-noise ratio obtainable, but also reduce the speed of operation of the memory by lengthening the time interval which must elapse between the application of alternative write and read signals. Thus, the elimination of such spurious noise signals is essential not only for enabling proper operation of a magnetic film array but also for obtaining the benefit of its inherently rapid switching rate.

A special type of storage system having very good noise cancellation capabilities is the so-called two-store or two-element per bit storage system. One such arrangement is disclosed in application Ser. No. 379,165, filed June 30, 1964, now Patent No. 3,435,429, and assigned to the assignee of the present invention. The above-mentioned application shows a two-store per bit storage matrix of the word-oriented type in which the bit and sense lines are arranged in conjunction with several differential amplifiers or common mode traps to eliminate spurious noise signals while at the same time sensing the core or film switching. As explained in that application, spurious noise due to inductive coupling from the bit drive lines is cancelled by utilizing a double cancellation scheme plus the intentional generation of noise in a corresponding storage section. In the present invention, spurious noise signals generated in the sense lines are eliminated without the need for intentionally generating noise in a corresponding storage section and without the need for a double cancellation scheme. In a two-store per bit storage system, switching which occurs in the two storage positions of a single bit are sensed by two sense lines respectively. Throughout the system, the two sense lines are arranged in conjunction with the bit drive lines and the word lines such that equal noise will be generated in both sense lines and will therefore be cancelled by a single common mode trap or differential amplifier at the same line output ends.

It is therefore an object of the present invention to provide new and improved storage array capable of achieving a high signal-to-noise ratio at the array outputs.

A further object of the present invention is to prevent false indications of stored information due to spurious noise coupled into the sense lines of a memory array.

Another object of the present invention is to provide in a two-store per bit memory array a new and improved arrangement of bit and sense lines for eliminating inductively coupled and capacitively coupled noise signals in the sense lines.

Another object of the present invention is to provide in a two-store per bit word oriented memory array a new and improved arrangement of bit, sense and word lines for cancelling bit coupled noise, word coupled noise and adjacent bit coupled noise which is generated in the sense lines.

The foregoing and other objects, features and advantages of the invention will be apparent from the following more particular description of a preferred embodiment of the invention, as illustrated in the accompanying drawings.

Figure 2:
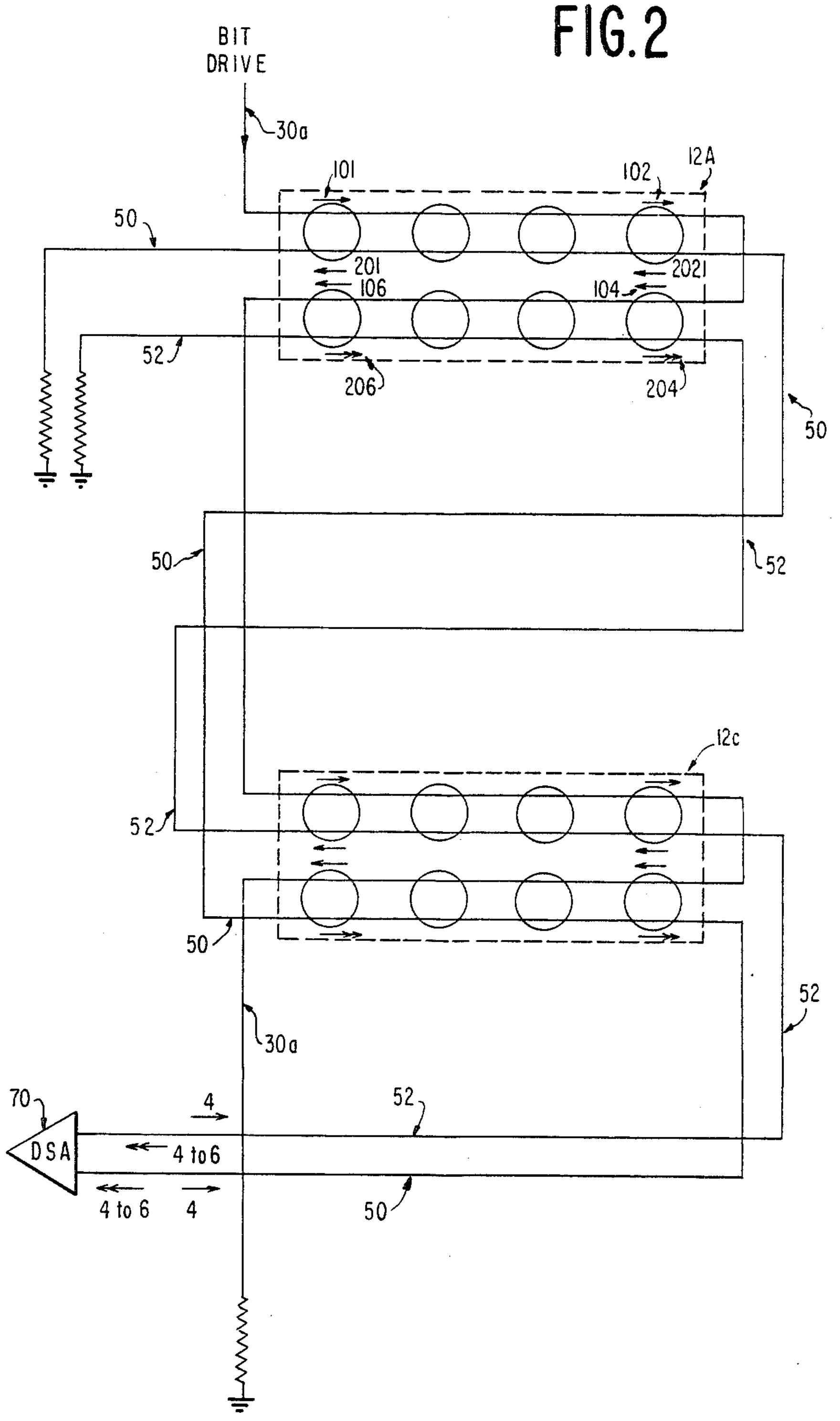
Figure 3:
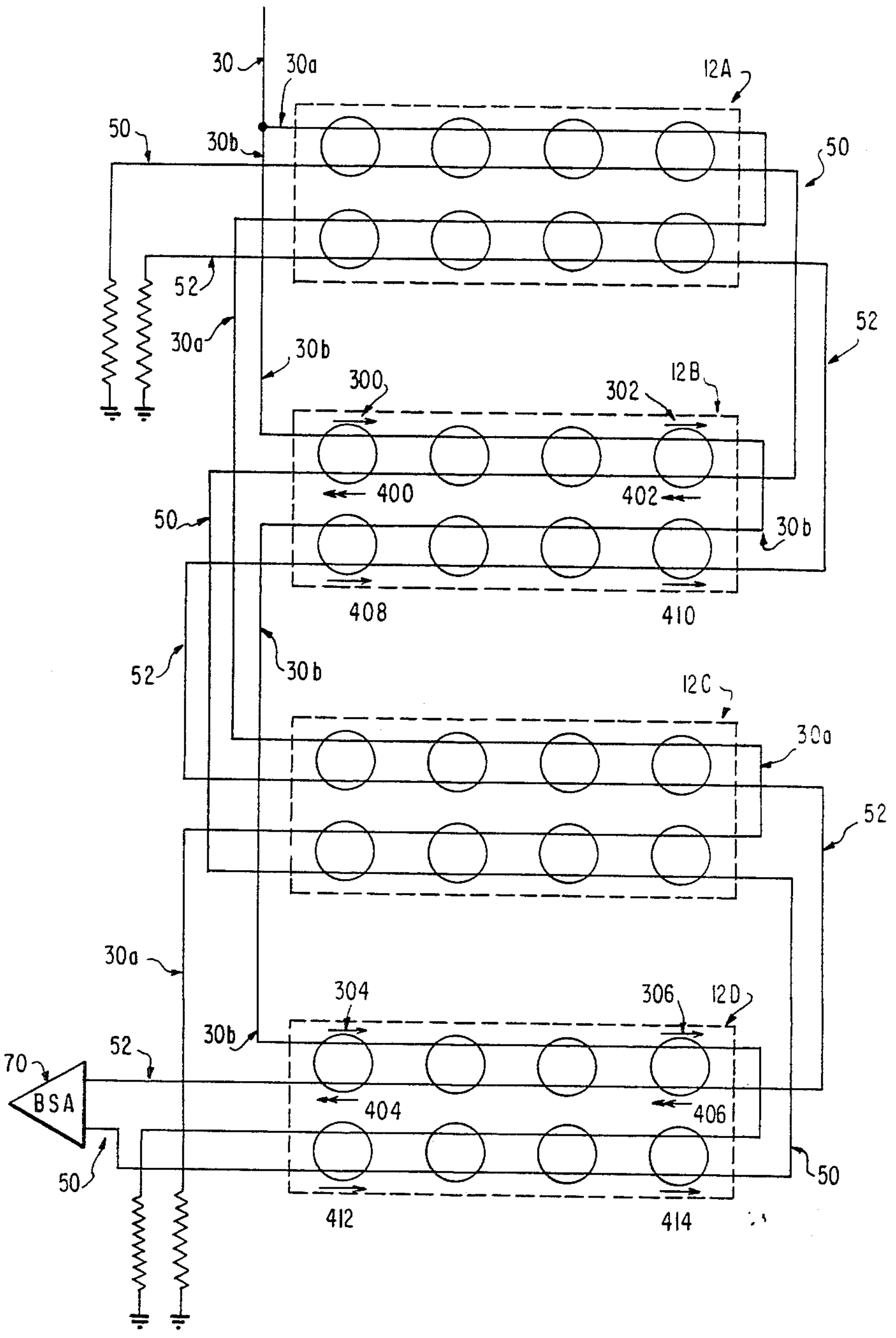
Figure 4:
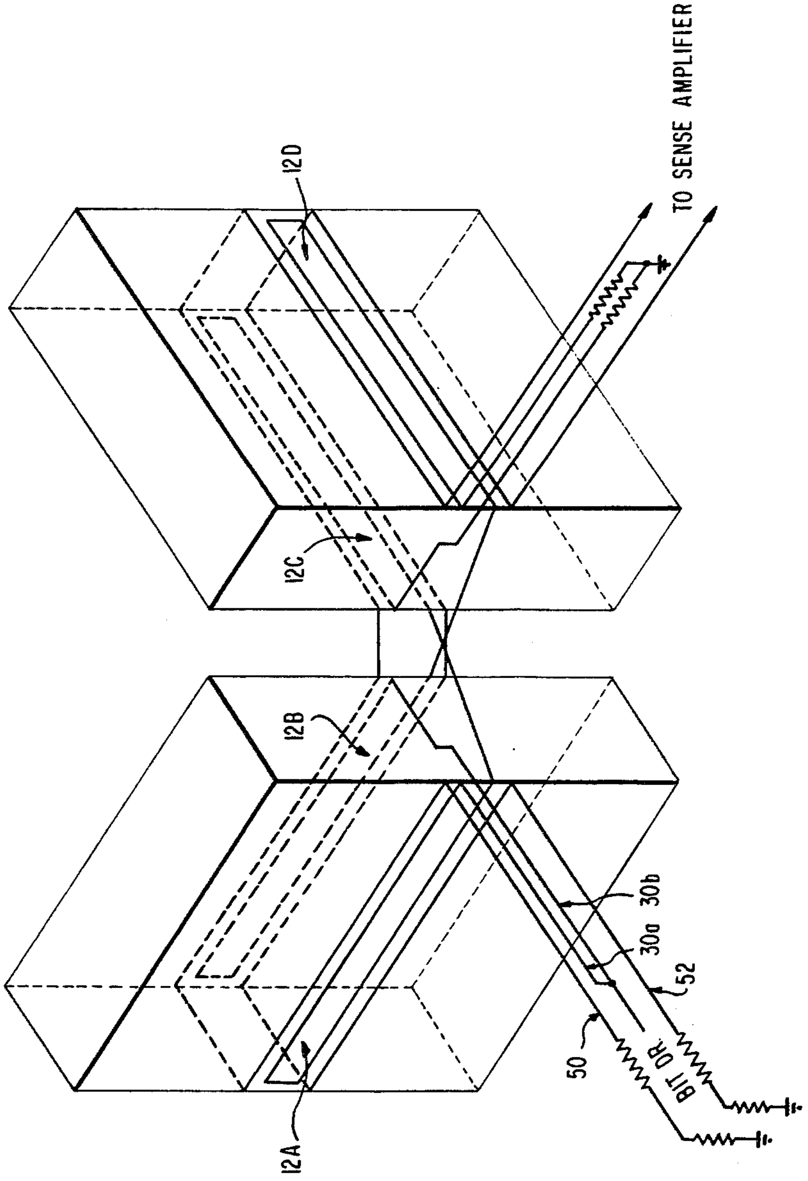
Figure 5:
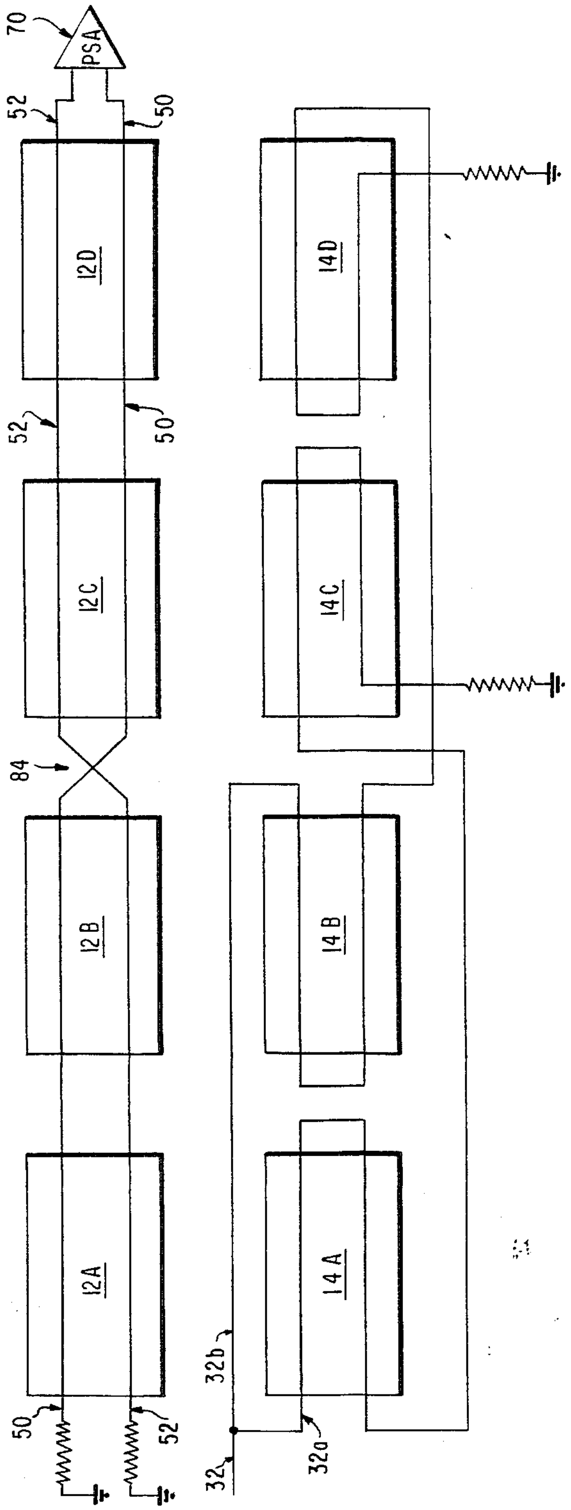

In the drawings:

FIGURE 1 is a preferred embodiment of the magnetic storage memory of the present invention;

FIGURES 2, 3, and 4 are schematic diagrams helpful in explaining the operation of the invention; and FIGURE 5 is a partial schematic of a portion of the embodiment of FIGURE 1 with an alternation for cancelling adjacent bit coupled noise.

In FIGURE 1, word-organized storage matrix 10 comprises individual sections 12A through D, 14A through D, 16A through D, and 18A through D. Each individual section is shown in the drawing as containing four bit positions, but in actual practice many more bit positions per storage location may be used. Since the storage matrix used is the two-element or two-store per bit type, each bit position comprises two storage elements which may be either thin films or magnetic cores. For example, in section 12A the first bit position comprises storage elements **20*a* and 20*b*, the second bit position comprises storage elements 22*a* and 22*b*, etc. The storage elements are driven by switching signals applied on bit drive lines 30, 32, 34, and 36, and by signals on the word lines 40, 42, 44, and 46. Only the word lines for the A storage sections are shown in the drawing, but it will be apparent that identical word lines are used for the B, C, and D storage sections. Each of the bit drive lines and word lines is terminated in its characteristic impedance as is well known in the art. In the arrangement shown, each bit drive line passes over or is passed through the storage elements in a plurality of storage sections, as is well known in the art. The same group of storage sections is provided with two sense lines, for the purpose of detecting the stored information during readout time. For example, bit drive line 30 serves storage sections 12A, 12B, 12C, and 12D, and sense lines 50 and 52, each terminating respectively in their characteristic impedance at one end and being connected as inputs to a differential sense amplifier 70 at the other end, are provided to sense the switching in the storage elements which make up sections 12A through 12D**.

In accordance with known techniques for effecting storage in a magnetic film of uniaxial anisotropy by orthogonal pulsing techniques, the word pulse, propagating along a word line passing parallel to the easy axis of a film, creates a magnetic switching field which rotates the magnetic polarization of the film to an unstable position transverse to the easy axis, called the "hard" axis. The word pulse commonly is 600 to 700 mils and creates a magnetic switching field of 10 to 15 oersteds.

The bit pulse rise actually follows the word pulse rise by a slight delay, but does exist concurrently therewith for a portion of its time interval. The bit pulse commonly is 250 to 350 mils and creates a magnetic switching field of ½ to 1 oersted. The magnetic switching field created by the bit pulse rotates the magnetic polarization from the unstable position along the hard axis to a position of magnetic remanence parallel to the easy axis and in a direction determined by the polarity of the bit pulse. Thus, the storage of a "0" or a "1" is manifested by selectively rotating the magnetic polarization of the predetermined storage location in the film to a selected one of two oppositely directed remanence positions along the easy axis.

To effect readout, or sensing, of the stored information, a word or read pulse is applied to the word line, rotating the magnetic polarization to the hard axis, and inducing a sense signal in a sense line inductively coupled to the storage location in the film. Since there are two opposite directions of rotation to the "hard" axis from the opposite directions of remanence along the easy axis, in accordance with the stored information, the sensed pulses will be of opposite polarity, thereby, indicating the stored information bit value to be a "0" or a "1."

The system of FIGURE 1 operates in the orthogonal mode and requires generally coincident drive pulses on both the bit lines and on the word line associated with each half-bit store. Thus, to store a given information bit value, such as a "1," in the location comprising the component half-bit stores **20*a* and 20*b*, a word pulse is supplied to word line 40 by digital word driver 80, concurrently with the supply of a bit pulse on bit line 30. It can be seen that bit line 30 is split up into half-bit lines 30*a* and 30*b*, and for the purpose of understanding how a "1" is stored in the bit location defined by half-bit stores 20*a* and 20*b*, only half-bit line 30*a* is of interest. It can be seen that a pulse on half-bit line 30*a* propagates in one direction across half-bit store 20*a* and in the opposite direction across half-bit store 20*b*, thereby tending to orient the magnetic polarity of the two half-bit stores in opposite directions. The concurrent presence of a pulse on word line 40 and a positive polarity pulse on half-bit line 30*a* causes the magnetic fields of the half-bit stores 20*a* and 20*b* to be oriented along the easy axes thereof in opposite directions shown by arrows M and M′. For storing a "0" information signal in the bit position which is defined by half-bit stores 20*a* and 20*b*, a pulse is applied to word line driver 40 and a negative polarity pulse is applied to half-bit line 30*a*. The concurrence of the latter two mentioned signals causes the magnetic polarities of the two half-bit stores to be oriented along the easy axes in directions opposite to M and M′. Simply described, when a "1" is stored in the first bit position, the magnetic polarities of half-bit stores 20*a* and 20*b*** are in a direction as shown by arrows M and M′, i.e., pointing away from each other, and when a "0" is stored in the first bit position, the magnetic polarities of the two half-bit stores are in the directions opposite to the arrows M and M′, i.e., the polarities point towards one another.

To read out, or sense, information stored in a selected bit location, such as that constituted by the half-bit stores **20*a* and 20*b*, a word or read pulse is supplied to word line 40. The read pulse, by inductive coupling, switches the magnetic polarizations of the half-bit stores 20*a* and 20*b* to a horizontal position, directed to the left, along a hard axis. In either of the first or second relations of magnetic remanence polarizations of half-bit stores 20***a* and 20*b*, the switching will effect opposite rotations of the polarizations to assume this state. The opposite directions of rotation of the magnetic polarizations induce first and second sense signals of opposite polarity in the sense lines 50 and 52, respectively.

The sensed signals induced in sense lines 50 and 52 propagate to a common mode trap or differential sense amplifier 70 which performs a differential addition thereof. Since the sensed signals are of opposite polarities, the differential addition performed in the sense amplifier 70 produces a full sense signal which is supplied to memory output register 82. The output of the differential sense amplifier 70 is of a magnitude twice that of the first and second sense signals and of either a positive or negative polarity, determined by the relation of the polarities of the first and second sense signals indicating either a stored information bit value of "1" or "0."

As explained preivously, spurious noise signals are coupled into the sense lines by inductive and capacitive coupling from the bit lines and capacitive coupling from the word lines, and unless some means is used to eliminate the spurious noise signals, they will indicate the presence of a stored "1" or a stored "0" when neither actually exists. The method and means for eliminating the spurious signals will be explained below.

The manner in which spurious noise signals coupled into the sense lines due to pulses on the word lines are readily seen by the arrangement of word and sense lines in FIGURE 1. For example, assume a signal is applied to word line 40. The signal or word line 40 will cause capacitively coupled noise pulses in sense line 50 and sense line 52. These capacitively coupled noise signals are of the same polarity and travel the same distance to differential sense amplifier 70. Since these noise signals reach the differential sense amplifier 70 at the same time, they are cancelled thus eliminating word coupled noise at the output of the differential sense amplifier. It is apparent that any word coupled noise from any of the word lines coupled into any of the sense lines 50 through 64 will be eliminated by the differential sense amplifiers.

The method by which the unique arrangement of bit and sense wires cancels bit inductive noises is more complicated and is explained with the help of FIGURES 2 and 3. In FIGURE 2, only storage sections 12*a* and 12*c* and sense lines 50 and 52 and half-bit drive line 30*a* are shown. By examining FIGURE 2 and FIGURE 1, it becomes apparent that the half-bit line 30*a* has the same relation to sense lines 50 and 52 in both figures. The particular arrangement of these wires causes inductive noises of the same polarity due to the pulses on bit line 30*a* to be generated in both of the sense lines, and they are generated at such times that they reach the differential sense amplifier in coincidence and are thereby eliminated.

For purposes of explanation, the arrows shown adjacent to the bit and sense lines in FIGURE 2 indicate the direction of the current pulses therein. Additionally, for purposes of explanation, the current pulses which are directed toward the amplifier in the case of the sense lines and toward the characteristic impedance in the case of the bit drive line, will be referred to as positive pulses. The opposite direction currents will be referred to as negative pulses. Furthermore, positive polarity pulses induced in the sense lines are shown by double-headed arrows, whereas negative polarity pulses induced in the sense lines are shown by single-headed arrows.

The particular geometical arrangement of storage sections 12*a* through 12D causes a unit propagation time as the pulses pass across each section and a substantially zero propagation time as the pulses travel from one section to the next section. Relating the latter statement to FIGURE 2, each horizontal line is considered to have a propagation time equal to one unit and each vertical line is considered to have a propagation time equal to zero units. When a positive polarity pulse is applied to bit drive line 30*a*, it reaches the position shown by arrow 101 at zero unit time. At that time, a spurious noise signal indicated by arrow 201 is induced into sense line 50. As is well known in the art, a current signal in a first direction in a first wire induces a current signal in an opposite direction in an adjacent wire. The negative polarity signal indicated by arrow 201 reaches the differential sense amplifier 70 on lead or sense line 50 at unit time four. This can be seen by tracing the horizontal unit delays in the sense line 50. As the signal in bit line 30*a* moves from the position indicated by 101 at unit time zero to the position indicated by arrow 102 at unit time one, negative polarity signals such as those shown by arrows 201 and 202 are induced into sense line 50. All of these induced signals propagate towards the differential sense amplifier and arrive at unit time four.

From unit time one to unit time two, the pulse in half-bit drive line 30*a* travels through the line as indicated by arrows 104 and 106. The noise signals induced into sense line 52 by this latter propagation is shown by double-headed arrows 206 and 204. The latter inductively coupled positive noise signals are induced between times defined by unit time one and unit time two, and propagate towards differential sense amplifier 70 arriving between times defined by unit time four and unit time six. The bit drive line pulse as explained so far has induced negative polarity noise signals in sense line 50 arriving at the differential sense amplifier 70 at unit time four, and also has induced positive polarity noise signals in sense line 52 arriving at the differential sense amplifier 70 during the time defined by unit times four to six. The latter-described arrival at the differential sense amplifier 70 is indicated by a negative polarity or single-headed arrow adjacent to sense line 50 indicating arrival at unit time four, and a positive polarity or double-headed arrow adjacent line 52 indicating arrival at the differential sense amplifier at unit times four through six.

By tracing the excursion of the pulse on bit drive line 30*a* throughout its travel until it reaches the characteristic impedance on the line, it can be seen that during the travel over storage section 12C, which takes place between times two through four, negative polarity noise is induced into sense line 52 and arrives at the differential sense amplifier 70 at unit time four, and positive polarity noise is induced into sense line 50 arriving at the differential sense amplifier at unit times four through six. Since identical polarity noise signals arrive at the differential sense amplifier at the same times, they are cancelled in the differential sense amplifier thereby causing the output therefrom to be free of inductively coupled noise signals caused by the pulse in the bit drive line.

The pulse on the bit drive line also capacitively couples noise signals into the sense lines 50 and 52. The difference between the capacitively coupled noise and the inductively coupled noise is that the capacitively coupled noise is always of the same polarity as the signal on the bit drive line, and by tracing these noise signals on sense lines 50 and 52 through their excursions to the differential sense amplifier, it can be seen that they all arrive at the differential sense amplifier at corresponding times and are thereby cancelled.

FIGURE 3 shows the arrangement of bit and sense lines for sections 12A, 12B, 12C, and 12D. As previously explained in connection with FIGURE 1, bit line 30 is split into half-bit lines 30*a* and 30*b*; half-bit line 30*a* serving sections 12A and 12C, and half-bit line 30*b* serving sections 12B and 12D. The relation between half-bit line 30*a* and sense lines 50 and 52 is identical to that shown in FIGURE 2 and the inductively coupled signals and capacitively coupled signals are generated and cancelled in the same manner as previously explained. The pulse on half-bit line 30*b* also generates inductively coupled signals into the sense lines as they pass over sections 12B and 12D. The manner in which the latter-created inductively and capacitively coupled signals are generated and cancelled is identical to that described for half-bit line 30*a*. For example, between unit times zero and one, the pulse in half-bit line 30*b* is indicated by arrows 300 and 302, and induces positive polarity noise in sense line 50 as shown by arrows 400 and 402. The latter-induced positive polarity noise arrives at the differential sense amplifier on sense line 50 between unit times two and four. The pulse in half-bit line 30*b* also induces positive polarity noise in sense line 52 which arrives at the differential sense amplifier at unit times two through four and thereby cancels the positive polarity noise signals on sense line 50. The latter-induced positive polarity noise signals are indicated by arrows 304, 306, 404, and 406 in section 12D.

The signal on half-bit line 30*b* also induces negative polarity noise in sense line 52 as indicated by arrows 408 and 410, and in sense line 50 as indicated by arrows 412 and 414. The latter negative polarity noise pulses on both sense lines arrive at the differential sense amplifier at unit time four and are thereby cancelled. Although the manner in which the invention cancels bit coupled inductive noise and bit coupled capacitive noise is explained with reference to FIGURES 2 and 3, the same relationship holds true for the arrangement of wires shown in FIGURE 1.

One possible geometrical arrangement of storage sections 12A, 12B, 12C, and 12D which will allow unit propagation time across the storage sections and substantially zero propagation time between storage sections is shown in FIGURE 4. The dimensions in FIGURE 4 are greatly exaggerated for the purpose of clarity, and, furthermore, it is apparent that other possible geometric arrangements will suggest themselves to those having ordinary skill in the art. It is to be noted that the length of any section, such as section 12A is much greater than the distance between sections, thereby providing the desired pulse propagation times. The unit time referred to in connection with FIGURES 1 through 3 may actually by any time measurement, the only requirement being that pulse propagation across all sections is the same.

One other type of noise which is generated in the sense lines and is undesirable is the so-called adjacent bit-line coupling noise. Adjacent bit line noise is that which would be coupled into sense lines 50 and 52 of FIGURE 1 by the pulse on bit line 32, also of FIGURE 1. In other words, the bit line to which we are referring serves the nearby section but, nevertheless, is close enough to couple noise into the sense lines. A minor adjustment of the sense wires shown in FIGURE 1 will cause the nearby bit line noise to cancel out, and that minor adjustment is shown in FIGURE 5 wherein only sections 12A through D and 14A through D are shown.

As stated above, the problem is to eliminate nearby bit coupled noise while at the same time maintaining the sense and bit wires at the relationship described in FIGURES 2 and 3 so that ordinary bit coupled noise will be eliminated. The only change necessary to achieve nearby bit coupled noise elimination is to cross the sense wires as indicated at point 84 and to reverse the excursion of the bit wires in the C and D sections in order to maintain the same relation as described in conjunction with FIGURES 2 and 3. For example, in FIGURE 1 half-bit line 32*a* after leaving section 14A enters section 14C at the bottom thereof in order to properly pass over the storage locations sensed by the lower sense line. However, since the sense lines are crossed prior to entering into the C and D sections, half-bit line 32*a* in FIGURE 5 after leaving section 14A enters section 14C at the top thereof in order to maintain the same relation to the sense line.

The manner in which nearby bit coupled noise is eliminated can be explained as follows. Assume a positive polarity bit pulse is applied to bit line 32 thereby causing positive polarity pulses to propagate through half-bit lines 32*a* and 32*b*. As the pulse propagates across the top of section 14A from unit times zero to one, negative polarity signals are induced into sense line 52 and arrive at the differential sense amplifier 70 at unit time four. When the pulse in half-bit line 32*a* travels across the top of section 14C from unit times two to three, negative polarity signals are induced into sense line 50 and arrive at the differential sense amplifier at unit time four, thereby cancelling the negative polarity signals on sense line 52. A pulse also travels across the top of section 14B at unit times zero to one and induces positive polarity noise signals in sense line 52. The latter positive polarity noise signals arrive at the differential sense amplifier on sense line 52 at times two through four. When the signal on line 32*b* travels across the top of section 14*d*, which occurs between unit times two and three, positive polarity noise is induced into sense line 50 and arrives at the differential sense amplifier at times two through four, thereby cancelling the noise on sense line 52.

The noise coupling in the compact mass of conductors and storage elements of a storage device is complex. Capacitive coupling exists between each conductor and each of its nearby conductors. For example, there is capacitive coupling between a bit conductor and the nearby sense conductor. This coupling can be disadvantageous in that it can generate voltages on the sense conductor which can cause saturation of the sense amplifier and thus interfere with the next sensing operation.

The four basic classes of noise coupling are:

(1) Top bit conductor to top sense conductor
(2) Bottom bit conductor to top sense conductor
(3) Top bit conductor to bottom sense conductor
(4) Bottom bit conductor to bottom sense conductor.

These classes of noise are cancelled in the configuration according to the invention.

It can be seen by the above description that the invention which resides in a unique arrangement of bit, word, and sense lines provides in a two-element or two-store per bit storage system cancellation of word coupled noise, bit coupled noise, and adjacent bit coupled noise. The basic scheme resides in placing the bit lines relative to the sense lines such that the noise induced or capacitively coupled into the sense lines by the bit lines will be identical for both sense lines.

While the invention has been particularly shown and described with reference to preferred embodiments thereof, it will be understood by those skilled in the art that various changes in form and details may be made therein without departing from the spirit and scope of the invention.

What is claimed is:

1. A two-store per bit magnetic storage array wherein said array is divided into a plurality of storage sections each including a like number of bit positions and each bit position including an A store and a B store positioned adjacent to one another, the improvement comprising (a) a first sense line positioned to sense magnetic change in the A stores of first, second, third and fourth storage sections, (b) a second sense line positioned to sense magnetic change in the B stores of said first, second, third and fourth storage sections, (c) a differential amplifier having two inputs connected respectively to said first and second sense lines, (d) a first bit drive line positioned to cause magnetic change in the A and B stores of said first and second storage sections, said first bit drive line traversing the A stores of said first storage section in a first direction with respect to said first sense line and traversing the B stores of said second section in said first direction with respect to said second sense line, said first bit drive line traversing the B stores in said first storage section in a second direction with respect to said second sense line and traversing the A stores in said second storage section in said second direction with respect to said first sense line, and (e) a second bit drive line positioned to cause magnetic change in the A and B stores of said third and fourth storage sections, said second bit drive line traversing the A stores of said third storage section and the B stores of said fourth storage section in said second direction with respect to said first and second sense lines, said second bit drive line traversing the B stores of said third section and the A stores of said fourth section in said first direction with respect to said first and second sense lines, (f) said first direction being defined by the direction along said first and second sense lines toward said differential amplifier and said second direction being defined by the direction along said first and second sense lines away from said differential amplifier.

2. The system as claimed in claim 1 further comprising characteristic impedances connected respectively to said first and second bit drive lines at one end thereof, the other ends being connected together and to a source of bit drive pulses.

3. The system as claimed in claim 1 wherein said A and B stores are thin film magnetic elements.

References Cited

UNITED STATES PATENTS

| | | | |
|---|---|---|---|
| 3,142,049 | 7/1964 | Crawford | 340—174 |
| 3,191,163 | 6/1965 | Crawford | 340—174 |
| 3,329,940 | 7/1967 | Barnes et al. | 340—174 |
| 3,209,337 | 9/1965 | Crawford | 340—174 |

OTHER REFERENCES

Stapper, C. H.: Low Noise Thin Film Memory, IBM Technical Disclosure Bulletin, vol. 6 (8), p. 50–5, January 1964.

BERNARD KONICK, Primary Examiner

GARY M. HOFFMAN, Assistant Examiner